W. JAQUIERY.
SNAP FASTENER STUD.
APPLICATION FILED OCT. 20, 1919.

1,373,076.

Patented Mar. 29, 1921.

Inventor
William Jaquiery
By Howard E Barlow
Attorney

UNITED STATES PATENT OFFICE.

WILLIAM JAQUIERY, OF PROVIDENCE, RHODE ISLAND, ASSIGNOR TO FULFORD MFG. CO., OF PROVIDENCE, RHODE ISLAND, A CORPORATION OF RHODE ISLAND.

SNAP-FASTENER STUD.

1,373,076. Specification of Letters Patent. Patented Mar. 29, 1921.

Application filed October 20, 1919. Serial No. 331,949.

*To all whom it may concern:*

Be it known that I, WILLIAM JAQUIERY, a citizen of the United States, and resident of the city of Providence, in the county of Providence and State of Rhode Island, have invented certain new and useful Improvements in Snap-Fastener Studs, of which the following is a specification.

This invention relates to snap fastener studs; and has for its object to provide a spring cage member, and a member extending into said cage to support the top of the same against a crushing action.

With these and other objects in view, the invention consists of certain novel features of construction, as will be more fully described, and particularly pointed out in the appended claims.

Figure 1:
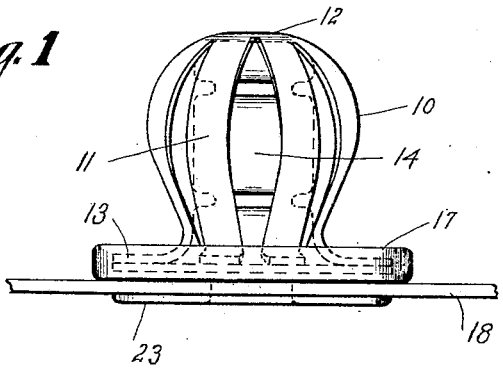

In the accompanying drawings:

Figure 1— is a side elevation showing my improved fastener stud with the anvil or supporting member inserted therein.

Figure 2:
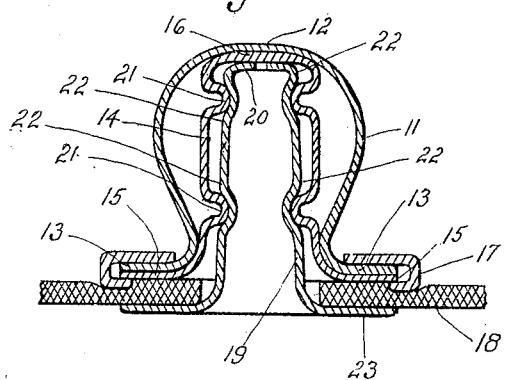

Fig. 2— is a sectional elevation showing the cage member and the anvil or supporting member inserted into the cage to support the same against a crushing action; also showing the rivet or post member as inserted and locked in the anvil member.

Figure 3:
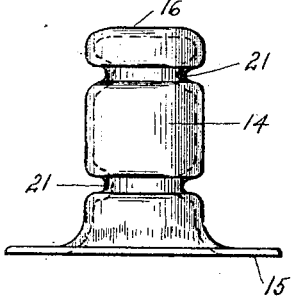

Fig. 3— shows the anvil member in elevation.

Figure 4:
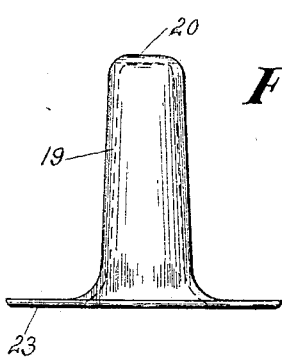

Fig. 4— shows the post or rivet member in elevation.

Referring to the drawings, 10 designates the cage member which is made of flat spring stock having a plurality of arms 11 connected together at 12. These arms are bent to form substantially a spherically-shaped body, the free ends of the arms being turned outwardly forming radiating feet 13. By this construction the walls of the cage member are permitted to yield when pressed into the socket member of the fastener (not shown).

It is found in practice that any undue pressure on the outer end or top portion 12 of this cage member will crush and easily destroy the same. To obviate this difficulty I have provided a support or anvil member 14 which is preferably made in tubular form having an annular flange 15 engaging the under side of the feet 13 of the cage arms the body portion of this anvil member being designed to extend from the bottom of the feet 13 upwardly, its outer end 16 engaging the under side of the top wall 12 to firmly support the same against a crushing action.

In order to secure the feet 13 to the flange 15 I have provided a collar 17 which extends over the top of the feet and is then folded around beneath the flange 15 binding these two securely together.

In order to secure this stud member to the fabric or material 18 on which it is designed to be carried it is found necessary to provide a tubular rivet or post 19 having a flange 23, said post being made of soft or readily bendable, or crushable material and of sufficient length so that when it is forced into the tubular anvil member its upper end 20 will engage the upper end wall of the anvil, and the post will be crushed and enlarged in different places along its length, as illustrated in Fig. 2.

To accomplish the locking of this post 17 in the tubular anvil, I have provided inwardly-extending portions 21 in the side walls of this anvil body, which portions may be made in the form of annular ribs or in any other desired shape to engage the outwardly-extending portions 22 of the wall of the rivet or post due to the crushing action to lock the two members together thereby attaching the stud member to the fabric or material 18.

My improved snap fastener is simple and inexpensive and most practical in construction and by its use the positive support in the case renders the latter practically indestructible against any pressure which may be brought against the end thereof.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A snap fastener stud comprising an outer spring cage member, a tubular anvil member extending into said cage its inner end engaging the top wall of said cage to support it against a crushing action the lower end of said anvil being secured to the base of said cage, and means in said anvil member for engaging and locking a rivet or post when forced thereinto.

2. A snap fastener stud comprising an outer spring cage element flanged at its lower edge, an anvil member whose normal length is just sufficient to cause its inner end to engage and support the top wall of said cage, the outer end of said anvil being flanged and attached to the base of said cage said anvil being provided with inwardly-extending portions to engage a securing rivet or post when inserted therein.

In testimony whereof I affix my signature.

WILLIAM JAQUIERY.